United States Patent Office 3,493,620
Patented Feb. 3, 1970

3,493,620
HALO SUBSTITUTED ETHYLENE
MERCAPTANS
Harry E. Gunning, Edmonton, Alberta, Canada, assignor to Imperial Oil Enterprises Limited, a corporation of Canada
No Drawing. Continuation-in-part of application Ser. No. 427,171, Jan. 21, 1965. This application Mar. 1, 1967, Ser. No. 619,583
Int. Cl. C07c *149/16, 149/08, 149/00*
U.S. Cl. 260—609    7 Claims

ABSTRACT OF THE DISCLOSURE

Thiols and/or episulfides are produced by the reaction of compounds having olefinic or acetylenic unsaturation with sulfur atoms derived from the in situ photolysis of COS, $CS_2$ or $CF_2S$ by ultraviolet or other radiation. The compounds are useful as intermediates for polymers.

---

This application is a continuation-in-part of Ser. No. 427,171, filed Jan. 21, 1965, now abandoned, which in turn is a continuation-in-part of U.S. Ser. No. 309,866, filed Sept. 18, 1963, now abandoned.

The present invention relates to novel processes for the selective preparation of various novel sulfur-containing compositions. More particularly, this invention relates to novel methods for selectively generating certain excited states of the sulfur atom and reacting these atoms with olefinic compounds under carefully controlled reaction conditions so as to produce a variety of sulfur-containing compounds, many of which were heretofore unknown to those skilled in the art. In one preferred embodiment, this invention relates to reacting compounds containing olefinic bonds or acetylenic bonds (those described hereafter) with sulfur atoms derived from the in situ photolysis of COS, $CS_2$ or $CF_2S$ by ultraviolet or other radiation e.g., X- or gamma rays, to obtain a reaction product comprising novel unsaturated thiols and/or episulfides depending upon the selected conditions of reaction. In one typical embodiment, this invention relates to reacting the above-described materials at temperatures of 0 to 300° C. in both the gaseous and liquid phases in the presence of ultraviolet light utilizing mole ratios of olefinic compound or acetylenic compound to COS, $CS_2$ or $CF_2S$ of above 1:1.

It has been known in the prior art that many elements and compounds are capable of existing, at least for short periods of time, in an excited state. The various excited states of a given atom, compound or other material are normally generated by the adsorption of sufficient energy by the material so as to have an effect on its electronic configuration. It is also known in the art that every atom or molecule may exist in several excited states, dependent upon the amount of energy absorbed by the atom or molecule. Thus, for example the excited states of the sulfur atom have been studied and characterized by atomic spectroscopy. These studies, as reported in Atomic Energy Levels, Circular of the National Bureau of Standards, #467 (1962), indicate that sulfur atom may exist, for example, for short periods of time in the following states: $3(^3P_2)$, $3(^3P_1)$, $3(^3P_0)$, $3(^1D_2)$, $3(^1S_0)$ where the $3(^3P_2)$ state is the ground state of the sulfur atom, and the $3(^3P_1)$, $3(^3P_0)$, $3(^1D_2)$ and $3(^1S_0)$ are respectively 1.134, 1.639, 26.40 and 63.39 Kcal./mole above the ground state.

The above characterization of several of the possible states of the sulfur atom have a well-known meaning to those skilled in the art as can be determined by reference to a standard text such as "The Theory of Atomic Spectra," E. U. Condon and G. H. Shortley, Cambridge, University Press, 1959. Thus, for example the term $$"S[3(^1D_2)]"$$

refers to a sulfur atom with 26.40 Kcal./mole of electronic energy above the lowest electronic energy of the sulfur atom. Energy levels of the electrons in atoms are described by terms of the form: $n(^AX_B)$, where $n$ is the principal quantum number; A is the multiplicity, which when equal to 1, 2, 3, etc., is termed, singlet, double, triplet, etc.: X is a letter designating the value of the azimuthal quantum number and when this number has respectively the values, 0, 1, 2, 3, 4, X becomes S, P, D, F, G; and B, the values of the total angular momentum quantum number. Thus, the term "$3(^1D_2)$" states that $n=3$, $A=1$, $X=2$, $B=2$, and the term "$3(^3P)$," states $n=3$, $A=3$, and $X=1$, where $n$, A, X, and B are described above. Since the principal quantum number, $n$, will be the same (3) for all of the sulfur atoms they are hereinafter referred to as $S(^AX_B)$ or generically $S(^AX)$ rather than $S3(^AX_B)$. While atomic spectroscopy has permitted analysis of the various states of sulfur, it has not herefore been deemed possible to segregate electronically excited states of the sulfur atom for more detailed study in terms of their chemical behavior.

It is, therefore, an object of this invention to provide a novel process for preparing sulfur compounds by the reaction of selected electronic states of sulfur with olefinic or acetylenic compounds.

It is another object of this invention to produce novel sulfur-containing compounds by reacting selected electronic excited states of sulfur with olefinic or acetylenic compounds.

Yet a further object of this invention is to provide a novel process for the insitu generation of selected electronic states of sulfur in an olefinic environment so as to produce episulfides and /or novel thiols. The present invention will be more clearly understood from a consideration of the following chemical equations which present the general mechanism (as it is now understood) of the present reactions.

(A) Formation of monatomic sulfur $$COS \xrightarrow{\text{light}} CO + S(^1D)$$

$$CF_2S \xrightarrow{\text{light}} CF_2 + S(^1D)$$

$$CS_2 \xrightarrow{\text{light}} CS + S(^3P)$$

(B) Reaction of monatomic sulfur with monoolefins

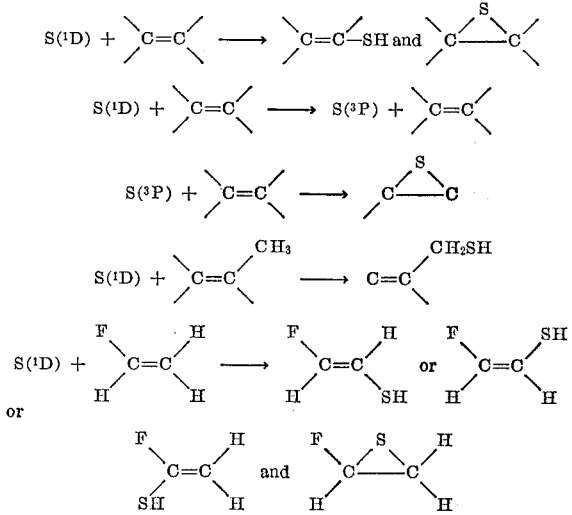

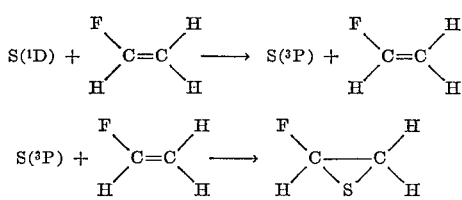

(C) Reaction of monatomic sulfur with conjugated and nonconjugated polyolefins: e.g., 1,3-butadiene, 1,4-pentadiene.

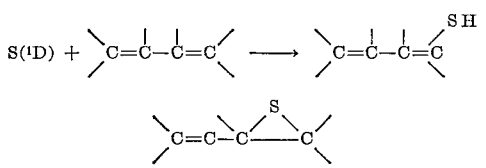

and

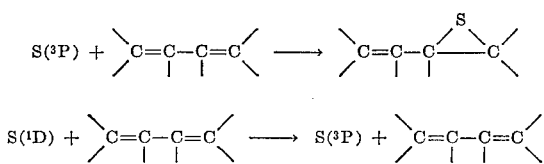

(D) Reaction of monatomic sulfur with acetylenes.

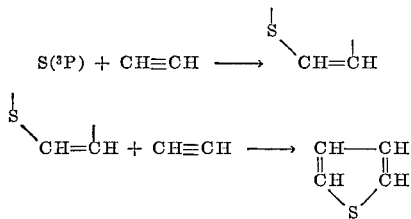

The main evidence for the mechanisms of the reactions and the spectroscope states of the sulfur atoms involved as described in the above equations come from the nature and distribution of the products and their dependence on such parameters as: (A) the partial and total pressure (concentration) of the reacting gases (liquids) and added inert gases (solvents); (B) temperature; (C) wavelength of the exciting radiation; (D) structure of the substrate.

Unequivocal proof that only S($^1$D) atoms give insertion products, that is thiols, is provided by the effect of the inert gas, carbon dioxide, on the relative yields of the vinyl mercaptan to ethylene episulfide. When the reaction, the photolysis of COS in the presence of $C_2H_4$, is carried out with increasing amounts of added carbon dioxide, the vinyl mercaptan formation is gradually suppressed while the episulfide yield increases so that their sum remains constant.

The only explanation of these results is the assumption that the sulfur atoms responsible for vinyl mercaptan formation are in an excited state and the carbon dioxide molecules are an effective remover of this excitation energy in their collision with the excited atoms, $$S(^1D) + CO_2 \rightarrow S(^3P) + CO_2'$$

where the prime signifies that the $CO_2$ molecules are virbartionally excited.

The only electronic state available in the energy region determined by the wave length of the effective radiation, on one hand, and the C=S bond energy in COS and the well established electronic energy levels of sulfur atoms, on the other hand, is the 3($^1$D) state which has an excitation energy of 26.4 Kcal./mole above the ground state.

As can be seen from the above-described equations it has now been discovered that the reaction of singlet [S($^1$D)] sulfur atoms with olefinic compounds results in the formation of thiols via an insertion reaction. It can further be seen that the reaction of the lowest energy (ground state) or triplet [S($^3$P)] sulfur atom with olefinic compounds results exclusively in the formation of cyclic sulfides. The present invention thus provides a novel process for producing either a mixture of thiols and a cylic sulfide by reaction of an olefinic compound with S($^1$D) atoms or selectively forming a cyclic sulfide by reaction of an olefinic compound with S($^3$P) atoms.

Suitable feedstocks for use in the present invention are unsaturated organic feeds either gaseous or liquid, containing 5 to 100 mole percent of unsaturated compounds, provided the remaining constituents of the feed do not contain olefinic or accetylenic bonds: e.g., the feed may contain up to 95 mole percent of saturated paraffinic hydrocarbons as follows:

(A) $C_2$ and $C_4$–$C_{30}$, preferably $C_2$ and $C_4$–$C_{18}$ branched and straight chain monoolefins including those containing other functional groups such as aryl groups, carboxyl groups, chlorine, fluorine, etc., e.g., ethylene, isobutylene, butene-1, butene-2, 2-methylbutene-1, pentenes, heptenes, dodecene-1, styrene, oleic acid, etc.

(B) $C_4$ to $C_{18}$, preferably $C_4$ to $C_{12}$ cyclic monoolefins and substituted monoolefins, including as substituents aryl groups, carboxyl groups, chlorine, fluorine, etc., e.g., cyclobutene, cyclopentene, cyclohexene, cycloheptene, cyclooctene, etc., and the alkyl-substituted derivatives thereof, cyclopentenoic acids, cyclohexenoic acids, cinnamic acid, etc.

(C) $C_3$ to $C_{18}$, preferably $C_3$ to $C_{12}$ branched or straight chain conjugated and nonconjugated aliphatic diolefins, and substituted diolefins including as substituents aryl groups, carboxyl groups, chlorine, fluorine, etc., e.g., allene, 1,3-butadiene, 1,2-butadiene, 1,4-pentadiene, isoprene, chloroprene, 1,5-hexadiene, etc.

(D) $C_4$ to $C_{12}$, preferably $C_4$ to $C_8$ cyclic diolefins, and substituted cyclic diolefins including as substituents aryl groups, carboxyl groups, chlorine, fluorine, e.g., cyclobutadiene, the cyclopentadienes, the cyclohexadienes, and substituted derivatives thereof, including for example cyclohexadienoic acids, cycloheptadienes and cyclooctadienes.

(E) $C_6$ to $C_{18}$, preferably $C_6$ to $C_{12}$ noncyclic and cyclictriolefins, and substituted triolefins including as substituents aryl groups, carboxyl groups, chlorine, fluorine, etc., e.g., cycloheptatriene, cyclooctatrienes, 1,3,5-hexatriene, heptatrienes, triolefinic fatty acids, etc.

(F) $C_2$ to $C_{18}$, preferably $C_4$ to $C_{12}$ branched and straight chain acetylenes, e.g., acetylene, methyl acetylene, 1-propylacetylene, ethyl-s-butylacetylene, etc.

(G) Other nonhydrocarbon feeds include furan, thiophene, 1,4-pyrone, alkyl- and aryl-substituted thiophenes, unsaturated alcohols, e.g., allyl alcohols, etc.

A particularly preferred class of feedstocks for use in the present invention may be represented as:

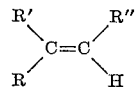

wherein R, R′ and R″ may be the same or different and are selected from the group consisting of halogen, pseudohalogen and hydrogen. More particularly, R, R′ and R″ are selected from the group consisting of H, F, Cl, I, Br and CN. These feedstocks are of particular interest since when reacted with singlet [S($^1$D)] sulfur atoms in accordance with this invention they result in novel compositions of matter having the structure:

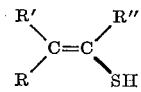

wherein R, R′ and R″ have the same definitions as described above. These vinylic thiols are novel materials were recovered and analyzed as set forth in Example 3. The results are set forth in Table III below.

The results indicate that increased ethylene pressure favors the formation of the novel vinyl mercaptan (VM) product.

These results clearly indicate that the episulfide,

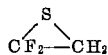

and the vinyl mercaptan $CF_2=CHSH$ are the major reaction products.

In another series of experiments the partial pressure of COS and $CF_2CH_2$ were maintained constant at 50 torr respectively and an exposure time of 30 minutes was employed while varying the partial pressure of added $CO_2$. The purpose of this experiment was to determine the effect of the inert gas on product selectivity. The results indicated that the addition of $CO_2$ pressure in the range of 0 to 1000 torr, preferably to 350 torr, had the effect of increasing the selectivity of the reaction for the production of $CF_2=CHSH$.

TABLE III

| P($C^2H^4$), mm. | Rates in micromoles per 30 minutes | | | | | Percent in product | | Yield,* Percent |
|---|---|---|---|---|---|---|---|---|
| | $R_{CO}-R°_{CO}/2$ | ES | VM | ES+VM | $R°_{CO}-R_{CO}$ | ES | VM | |
| 0 | 4.57 | | | | | | | |
| 25 | 2.25 | 0.91 | 0.63 | 1.54 | 2.22 | 59 | 41 | 69.5 |
| 50 | 1.68 | 1.24 | 0.84 | 2.08 | 2.79 | 60 | 40 | 74.5 |
| 100 | 1.41 | 1.60 | 1.25 | 2.85 | 3.06 | 56 | 44 | 93 |
| 200 | 0.84 | 1.68 | 1.44 | 3.12 | 3.53 | 54 | 46 | 88.5 |
| 300 | 0.62 | 1.70 | 1.51 | 3.21 | 3.21 | 53 | 47 | 83.5 |
| 400 | 0.44 | 1.72 | 1.61 | 3.33 | 4.03 | 52 | 48 | 82.5 |
| 600 | 0.36 | 1.77 | 1.68 | 3.44 | 4.11 | 51 | 49 | 84 |
| 800 | 0.15 | 1.81 | 1.72 | 3.53 | 4.32 | 51 | 49 | 82 |

*Yield in terms of ($R°_{CO}-R_{CO}$), i.e. in terms of the decrease in the rate of carbon monoxide formation.

EXAMPLE 5

In an attempt to prove that the formation of cyclic sulfides is associated with triplet, $S(^3P)$, sulfur atoms a series of experiments were carried out in which 50 torr of COS and 200 torr of ethylene were irradiated at 25° C. for a period of 30 minutes while the pressure of an inert gas, $CO_2$, was varied from 0 to 1000 torr. The reaction conditions and analytical techniques were otherwise similar to Examples 3 and 4. The results are tabulated in Table IV below:

TABLE IV

| P($CO_2$), mm. | Rate, μmoles/30 min. | | | Percent Distrib. | |
|---|---|---|---|---|---|
| | CO | VM | ES | VM+ES | VM | ES |
| 0 | 4.15 | 1.54 | 1.89 | 3.44 | 44 | 56 |
| 138 | 4.08 | 1.29 | 2.15 | 3.44 | 38 | 62 |
| 256 | 4.10 | 1.26 | 2.58 | 3.84 | 33 | 67 |
| 385 | | 0.77 | 2.73 | 3.51 | 22 | 78 |
| 500 | 4.06 | 0.55 | 3.08 | 3.63 | 16 | 84 |
| 760 | 4.05 | 0.28 | 2.60 | (2.88) | 10 | 90 |
| 1,000 | 4.06 | 0.28 | 3.00 | 3.28 | 8 | 92 |

The results indicate that increases in the partial pressure of the inert $CO_2$ gas result in the selective formation of cyclic sulfides.

Based upon the previous discussion in this specification of the reaction $$S(^1D)+CO_2 \rightarrow S(^3P)+CO_2'$$

it follows that triplet atoms do not form vinyl thiol, and that the thiols are formed only from singlet excited sulfur atoms.

EXAMPLE 6

A series of experiments similar to Examples 3 to 5 and utilizing analytical techniques similar to those described in Example 3 were carried out utilizing 1,1-difluoroethylene as the olefinic feedstock. In one series of experiments the partial pressure of 1,1-difluoroethylene was varied while the partial pressure of COS (100 torr) and the exposure time (15 min.) were held constant. The results are summarized in Table V below:

EXAMPLE 7

In a series of experiments similar to the previous examples and utilizing the analytical techniques described in Example 3, the partial pressure of $CFH=CH_2$ was varied between 0 and 800 torr while maintaining a constant COS partial pressure of 100 torr and a constant time of irradiation of 15 minutes. The results indicated that the major reaction products are the episulfide,

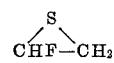

and the cis and trans isomers of 2-fluorovinyl mercaptan, $CHF=CHSH$.

EXAMPLE 8

In a series of experiments similar to the previous examples and utilizing the analytical techniques described in Example 3, the partial pressure of propylene was varied while maintaining a constant COS pressure of 100 torr and a reaction time (exposure to irradiation) of 30 minutes. The results summarized in Table VI indicate that the major reaction products were methyl vinyl mercap-

TABLE V

| P($C_2F_2H_2$), torr | Rates, μmoles/min. 10 | | | | | R(VM)/ R(ES) | Percent Recovery |
|---|---|---|---|---|---|---|---|
| | CO | VM | ES | ΣR(VM, ES) | CO°-CO | | |
| 0 | 4.43 | | | | | | |
| 50 | 2.95 | 0.07 | 0.53 | 0.60 | 1.48 | 0.13 | 41 |
| 100 | 2.71 | 0.20 | 0.77 | 0.97 | 1.71 | 0.26 | 54 |
| 200 | 2.53 | 0.30 | 0.81 | 1.11 | 1.89 | 0.37 | 59 |
| 300 | 2.43 | 0.33 | 0.86 | 1.19 | 2.00 | 0.38 | 60 |
| 400 | 2.33 | 0.38 | 0.90 | 1.28 | 2.09 | 0.42 | 61 |
| 600 | 2.25 | 0.38 | 0.93 | 1.31 | 2.17 | 0.41 | 60 |
| 800 | 2.21 | 0.39 | 0.87 | 1.26 | 2.21 | 0.45 | 58 | tan (MVM), allyl mercaptan (AM) and propylene episulfide (PS).

The relative yields of condensable products in the photolysis of COS and trans - butene - 2 as a function of

TABLE VI

| P(C₃H₆), mm. | Rates, μmoles/min. 10 | | | | | | | | | Percent Recovery |
|---|---|---|---|---|---|---|---|---|---|---|
| | CO | MVM | AM | PS | ΣR(MVM, AM, PS) | CO°-CO | R(MVM)/R(PS) | R(AM)/R(PS) | ΣR(MVM),(AM)/R(PS) | |
| 0 | 2.12 | | | | | | | | | |
| 25 | 1.57 | 0.049 | 0.047 | 0.343 | 0.439 | 0.546 | 0.14 | 0.14 | 0.28 | 81 |
| 51 | 1.48 | 0.060 | 0.046 | 0.366 | 0.472 | 0.640 | 0.16 | 0.13 | 0.29 | 74 |
| 103 | 1.36 | 0.083 | 0.076 | 0.377 | 0.536 | 0.754 | 0.22 | 0.20 | 0.42 | 71 |
| 205 | 1.28 | 0.092 | 0.099 | 0.410 | 0.601 | 0.836 | 0.22 | 0.24 | 0.47 | 72 |
| 305 | 1.25 | 0.084 | 0.103 | 0.450 | 0.637 | 0.870 | 0.19 | 0.23 | 0.42 | 73 |
| 406 | 1.20 | 0.075 | 0.094 | 0.450 | 0.619 | 0.920 | 0.17 | 0.21 | 0.38 | 67 |
| 505 | 1.11 | 0.113 | 0.121 | 0.470 | 0.704 | 1.00 | 0.24 | 0.26 | 0.50 | 70 |
| 604 | 1.11 | 0.097 | 0.127 | 0.480 | 0.704 | 1.00 | 0.20 | 0.27 | 0.47 | 70 |
| 802 | 1.09 | 0.106 | 0.123 | 0.490 | 0.719 | 1.03 | 0.22 | 0.25 | 0.47 | 70 |

EXAMPLE 9

Carbonyl sulfide and cis - 2 - butene at pressures of 100 torr respectively were irradiated in a series of reactions at varying exposure times in a quartz reaction vessel at a temperature of 25° C. utilizing a mercury resonance lamp adapted with a Vycor 7910 filter to exclude radiation of wave length less than 2290 A. Under these conditions only the 2537 A. line of this lamp was absorbed by the COS. The primary photolytic act in the decomposition of COS will be the same as with the previous examples, because the ultraviolet absorption by COS produces only $S(^1D)$ atoms between 2000 A. and 2550 A.

In a similar series of experiments trans - butene - 2 was reacted under identical conditions.

Table VII below indicates that reaction rates of cis and trans - butene - 2 were identical (within experimental error) as indicated by the rate of CO formation.

TABLE VII

| Time | $R_{co}$ in moles/min.×10⁷ | |
|---|---|---|
| | Cis-butene-2 | Trans-butene-2 |
| 5 | 1.89 | 1.85 |
| 10 | 1.81 | 1.80 |
| 18 | 1.85 | 1.82 |
| 30 | 1.84 | 1.87 |
| 60 | 1.83 | 1.80 |
| 91 | 1.79 | 1.80 |

The relative yields of condensable products in the photolysis of COS and cis - butene - 2 as a function of exposure duration are summarized in Table VIII below:

TABLE VIII

| Time, Min. | Relative yield in GC units, percent | | | | |
|---|---|---|---|---|---|
| | Trans-S[a] | Cis-S[b] | M[c] | Cis-S[d] | Trans-S[e] |
| 9 | 7.0 | 40.4 | 16 | 85 | 15 |
| 50 | 7.5 | 38.4 | 19.5 | 84 | 16 |
| 18 | 8.8 | 27.2 | 17.5 | 76 | 24 |
| 10 | 11.2 | 23.0 | 18.3 | 67 | 33 |
| 30 | 13.9 | 19.0 | 12.1 | 58 | 42 |
| 61 | 17.6 | 14.6 | 11.6 | 45 | 55 |

[a] Trans-butene-2 episulfide.
[b] Cis-butene-2 episulfide.
[c] Cis-butene-2-thiol-1.
[d] Mole-percent of cis isomer in an episulfide product.
[e] Mole-percent of trans isomer in the episulfide product.

exposure duration are summarized in Table IX below:

TABLE IX

| Time, Min. | Relative yield in GC units, percent | | | | |
|---|---|---|---|---|---|
| | Trans-S[a] | Cis-S[b] | M[c] | Cis-S[d] | Trans-S[e] |
| 5 | 44.6 | 2.6 | 16 | 5 | 95 |
| 10 | 42.0 | 2.9 | 18.4 | 6 | 49 |
| 18 | 38.0 | 3.3 | 18.8 | 8 | 92 |
| 30 | 37.1 | 3.3 | 15.9 | 8 | 92 |
| 60 | 27.5 | 3.7 | 15.4 | 12 | 88 |
| 91 | 27.6 | 3.9 | 8.1 | 12 | 88 |

[a] Trans-butene-2 episulfide.
[b] Cis-buteno-2 episulfide.
[c] Trans-butene-2-thiol-1.
[d] Mole-percent of cis isomer in the episulfide product.
[e] Mole-percent of trans isomer in the episulfide product.

A study of Tables VIII and IX makes it abundantly clear that episulfide formation from $S(^1D)$ atoms is a stereospecific process. Thus, the trans-episulfide forms from trans-butene-2 and the cis-episulfide forms from cis-butene-2. The rapid increase in trans-episulfide formation with increased exposure when reacting cis-butene-2 is readily explainable as an insitu isomerization which would be expected since the trans configuration is thermodynamically more stable.

The results indicate that $S(^1D)$ atoms may be reacted directly with an olefin to stereospecifically form episulfides and in addition react directly with the olefin via an insertion reaction to form a thiol. When these results are compared with the results of Example 5 wherein an inert gas was employed to deactivate the singlet sulfur atoms it becomes clear that $S(^1D)$ atoms will react with olefins to stereospecifically form cyclic sulfides and thiols while $S(^3P)$ atoms will selectively form cyclic sulfides.

EXAMPLE 10

In experiments similar to Example 3 and using similar analytical techniques vinyl chloride was reacted with photolysed carbonyl sulfide the COS being at a constant pressure of 100 torr and a reaction time of (exposure to radiation) 30 minutes. The vinyl chloride partial pressure was varied as shown in Table X, below. Two gas chromatographically separable products were formed which were shown by mass spectra to be a mixture of cis- and trans-2-chlorovinyl mercaptan, ClCH=CHSH and vinyl chloride episulfide.

TABLE X.—VARIATION IN PRODUCT YIELDS WITH VINYL CHLORIDE PRESSURE IN THE COS—VINYL CHLORIDE SYSTEM[a]

| P(C₂H₃Cl), torr | Rates, μmoles/30 min. | | | | | | Percent Recovery[c] |
|---|---|---|---|---|---|---|---|
| | CO | CO°-CO | CVM[b] | ES | Total C₂H₃ClS | CVM/ES | |
| 44.8 | 4.53 | 2.90 | 0.13 | 0.92 | 1.05 | 0.14 | 36 |
| 74.9 | 4.43 | 3.09 | 0.17 | 1.21 | 1.38 | 0.14 | 45 |
| 101.2 | 4.25 | 3.18 | 0.19 | 1.27 | 1.46 | 0.15 | 46 |
| 152.3 | 4.02 | 3.41 | 0.22 | 1.35 | 1.57 | 0.16 | 46 |
| 253.3 | 3.84 | 3.59 | 0.24 | 1.32 | 1.56 | 0.18 | 44 |
| 609.2 | 3.56 | 3.87 | 0.27 | 1.44 | 1.71 | 0.19 | 44 |
| 772.0 | 3.44 | 3.99 | 0.27 | 1.43 | 1.70 | 0.19 | 43 |

[a] P(COS)=100 torr; Exposure time=30 min.
[b] Chlorovinyl mercaptan.
[c] In terms of R°(CO)-R(CO).

What is claimed is:

1. A composition of matter having the structural formula:

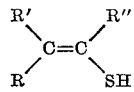

wherein R, R' and R'' are selected from the group consisting of H, F, Cl, I, and Br.

2. The composition $CH_2$=CHSH.
3. The composition $CH_2$=CFSH.
4. The composition CHF=CFSH.
5. The composition CFH=CHSH.
6. The composition $CF_2$=CHSH.
7. The composition CHCl=CHSH.

References Cited

Wiehe et al.; "J. Amer. Chem. Soc.," vol. 87, pp. 1442–1449 (1965).

CHARLES B. PARKER, Primary Examiner

D. R. PHILLIPS, Assistant Examiner

U.S. Cl. X.R.

204—158, 162, 163; 260—327, 329, 399, 465.7, 465.8, 465.9, 514, 526, 999

# United States Patent Office 3,493,637
Patented Feb. 3, 1970

3,493,637
HYDROXY PHENYL PHOSPHITES
Keith Coupland, Hull, England, assignor to The Distillers Company Limited, Edinburgh, Scotland, a British company
No Drawing. Filed Aug. 24, 1966, Ser. No. 574,557
Claims priority, application Great Britain, Sept. 15, 1965, 39,387/65
Int. Cl. C07f *9/12;* C10m *1/46*
U.S. Cl. 260—927                             8 Claims

ABSTRACT OF THE DISCLOSURE

Organic phosphites of formula

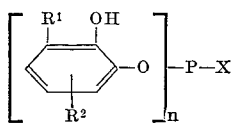

wherein $n$ is 1, 2 or 3, $R^1$ is a secondary or tertiary alkyl or aralkyl in which branching occurs at the carbon atom adjacent to the benzene ring, $R^2$ is hydrogen or a hydrocarbon radical or a halo-substituted radical or halogen or a nitro group and X is

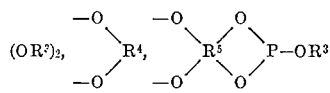

or

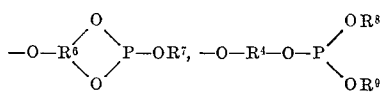

in which $R^3$, $R^7$, $R^8$ and $R^9$ are hydrogen or a hydrocarbon radical or a halo-substituted hydrocarbon radical, $R^4$, $R^5$ and $R^6$ are a hydrocarbon radical or a halo-substituted hydrocarbon radical, and when $n$ is equal to 3, X is equal to 0, are useful as antioxidants and additives for synthetic lubricants.

The present invention is an organic phosphite of formula

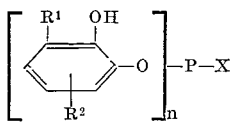

wherein $n$ is 1, 2 or 3 and when $n$ is 1 X is

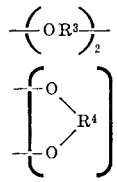

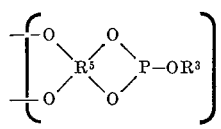

or

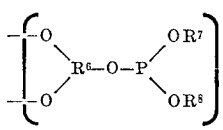

and when $n$ is 2 X is

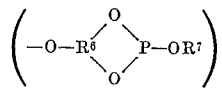

or

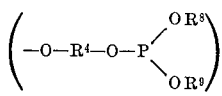

and wherein $R^1$ is a secondary or tertiary alkyl or aralkyl group in which branching occurs at the carbon atom adjacent to the benzene ring, $R^2$ is hydrogen, a hydrocarbyl group, a halohydrocarbyl group, a halogen or a nitro group, $R^3$, $R^7$, $R^8$ and $R^9$ are hydrogen, hydrocarbyl radicals or halohydrocarbyl radicals, And $R^4$, $R^5$ and $R^6$ are hydrocarbyl or halohydrocarbyl groups.

By a hydrocarbyl radical is meant any radical which may be derived from a hydrocarbon by loss of a hydrogen atom, for example an alkyl, aryl, aralkyl, alkenyl, cycloalkyl or cycloalkenyl radical.

These compounds may be used as antioxidants and anti-wear additives for synthetic lubricants, hydrocarbon lubricants, greases and plastic compositions. They may be used in diester lubricants derived from dicarboxylic acids and polyesters derived from polyhydroxy compounds, for example trimethylol propane-triesters, pentaerythritol tetra-esters and dipentaerythritol-hexa-esters. The lubricants may also contain additives such as dispersant and detergent additives, viscosity index improvers and pour point depressants.

The group $R^1$ may suitably contain from 3 to 20 carbon atoms and can be isopropyl, tert-butyl or $\alpha,\alpha$-dimethylbenzyl, for example.

The group $R^2$, which, when hydrocarbyl, may suitably contain up to 20 carbon atoms, can occupy the 5-position, for example (i.e. the position diametrically opposite the hydroxyl group). Examples of the group $R^2$ include methyl, tert-butyl, $\alpha,\alpha$-dimethylbenzyl, phenyl, Cl and Br.

The groups $R^3$ to $R^9$ may suitably be any alkyl group, for example those containing up to 9 carbon atoms. They can alternatively be a phenyl group, unsubstituted or substituted with one, two or three $R^2$ groups.

Another aspect of the present invention is a process for the preparation of an organic phosphite of the above formula which comprises reacting one mole of an organic phosphite of formula $P(OR)_3$, in which R represents a lower alkyl group or a lower haloalkyl group having up to 9 carbon atoms, with one, two or three moles of a substituted catechol of formula

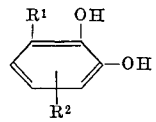

where $R^1$ and $R^2$ have the significance mentioned above. R can be for example tert-butyl or 2-chloroethyl.

A catalyst may be used to facilitate this reaction. A useful catalyst is a dialkyl phosphite, of for example the formula $HOP(OR)_2$, where R has the significance noted above.

Such a process for the preparation of the organic phosphite of the formula first mentioned above will produce the lower alcohol of formula ROH, liberated by the reaction of the organic phosphite of formula $P(OR)_3$